United States Patent [19]

Stevens et al.

[11] Patent Number: 4,793,931

[45] Date of Patent: Dec. 27, 1988

[54] PROCESS FOR TREATMENT OF ORGANIC CONTAMINANTS IN SOLID OR LIQUID PHASE WASTES

[75] Inventors: R.D. Samuel Stevens, Thornhill; Pauline M. Brown, Toronto, both of Canada

[73] Assignee: Solarchem Research, A Division of Brolor Investments Limited, Willowdale, Canada

[21] Appl. No.: 94,941

[22] Filed: Sep. 10, 1987

[51] Int. Cl.⁴ .................... B01D 11/00; C02F 1/32
[52] U.S. Cl. ...................... 210/636; 210/638; 210/748; 210/760; 134/1; 134/10; 204/158.21; 204/158.2; 422/186.3
[58] Field of Search .................. 134/1, 10, 11, 39, 40; 210/636, 638, 639, 748, 759, 760; 422/186.3; 204/157.15, 157.6, 157.61, 158.2, 158.21

[56] References Cited

U.S. PATENT DOCUMENTS

| | | | |
|---|---|---|---|
| 3,977,952 | 8/1976 | Knoevenagel et al. | 210/748 X |
| 4,012,321 | 3/1977 | Koubek | 210/748 |
| 4,437,999 | 3/1984 | Mayne | 210/748 |
| 4,517,063 | 5/1985 | Cviak | 422/186.3 X |

FOREIGN PATENT DOCUMENTS 0039386  3/1984  Japan .................. 204/158.2

Primary Examiner—Charles Hart
Attorney, Agent, or Firm—Rogers, Bereskin & Parr

[57] ABSTRACT

Solid or liquid phase wastes containing organic contaminants which can be photodegraded are treated. The contaminants are extracted into a perfluorinated solvent which is inert to the photodegradation step. In the case of solid wastes, such as contaminated soils, sediments or sludges, the contaminant is preferably first extracted into a hydrophilic solvent, such as acetone or methanol, and/or water, and is then extracted into the perfluorinated solvent. Photo-oxidants such as ozone are preferably used in the photodegradation step.

20 Claims, 4 Drawing Sheets 4,793,931

PROCESS FOR TREATMENT OF ORGANIC CONTAMINANTS IN SOLID OR LIQUID PHASE WASTES

BACKGROUND OF THE INVENTION

The invention relates to processes for removing and degrading organic contaminants from liquid or solid phase wastes such as wastewaters, soils, sediments and sludges. More particularly, the invention relates to processes for removing organic contaminants by solvent extraction techniques and degrading the contaminants by photodegradation techniques.

Wastewaters and contaminated soils or solids exist in ever increasing quantities. Chemical producers, pulp and paper plants, oil refineries and sewage treatment plants, for example, produce wastewaters containing toxic and hazardous organic contaminants. Contaminated soils and sediments result, for example, from accidental spills or leakages from underground storage tanks and pipelines as well as from manufacturing plant and transport accidents above ground. Also, land fill or disposal sites containing industrial wastes in storage drums can produce contaminated soils due to leakage. In these instances, the contaminants can also percolate through soils and sediments to contaminate ground water tables and aquifers.

Known treatments for contaminated liquid phase wastes, usually contaminated ground waters or wastewaters, include activated carbon absorption, incineration, packed bed aeration and chemical treatments including ozone or ozone/U.V. irradiation treatments. In many cases, the contaminant is merely transferred from one medium to another and is not removed or eliminated from the environment. Carbon absorption has the disadvantage of having to be replaced or to regenerate the carbon when it reaches its absorptive capacity. Chemical treatments are not available for a large variety of organic contaminants and can be prohibitively expensive. Also, in many instances ozone or ozone/U.V. irradiation techniques practised directly with wastewaters are too expensive or ineffective because large quantities of other compounds in the water can interfere with the photodegradation of a specific toxic organic contaminant targeted for removal. Incineration is only cost effective for very concentrated wastes and frequently results in pollutant emissions to the atmosphere. The packed bed aeration technique is only effective for highly volatile contaminants.

Treatments available for soils, sediments or sludges include incineration, pyrolysis, nucleophilic substitution for chlorinated compounds with such reagents as KPEG or APEG, solvent extraction of specific contaminants followed by carbon absorption or incineration, supercritical oxidation, and in-situ vitrification. Such treatments are expensive and, in some cases, such as the KPEG reagent, are limited to one specific class of compounds. Other of the treatments result in secondary waste disposal problems.

A review of a number of specific proposed waste treatment processes exemplify the limitations and shortcomings of many waste treatment techniques. In an article by M. Pat Esposito, Treatment Technologies for Dioxin Wastes, Proceedings of the National Conference of Hazardous Wastes and Hazardous Materials, Washington D.C., March 1987, treatment techniques for dioxin wastes are reviewed. One system developed by Syntex Agribusiness and IT Enviroscience utilizes solvent extraction and photolysis. The dioxin is extracted from sludge with a hexane solvent and the extract is then irradiated with U.V. light. A major disadvantage of such a process is that the solvent itself, being hydrocarbon in composition, is subject to photodegradation along with the targeted dioxin contaminant, thereby increasing the solvent costs and lowering the effectiveness of the photolysis process.

A technique proposed for the treatment of PCB contaminated solids was described by W. Steiner et al, Low Energy Process Technology for Extraction of PCB from Contaminated Sediment and Sludges at the International Congress on Hazardous Materials Management, Chattanooga, Tenn., June 1987. The process involves leaching the PCB from solids such as soil with a hydrophilic solvent such as acetone, transferring and concentrating the PCBs to a hydrophobic solvent such as kerosene and destroying the PCBs in the solvent stream either by known chemical means, such as with the KPEG reagent or by incineration. Because of the solvent losses in the destruction stages, the process is only cost effective if the contaminant is concentrated in the solvent.

Concentrated organic wastewaters may also be treated by high temperature oxidative techniques. One such process is described by D. Bhattacharyya et al., Oxidation of Hazardous Organics in a Two-Phase Fluorocarbon-Water System, Hazardous Waste & Hazardous Materials, Vol. 3, 1986, 405–427. In this process, wet air oxidation of contaminants in two phases, an aqueous phase which contains organic solutes and a non-polar, inert organic fluorocarbon phase which is presaturated with oxygen, is proposed. In general, wet air oxidation techniques suffer the disadvantages of needing concentrated wastes and high temperatures and pressures.

There is, therefore, a need for a process for the removal and destruction of toxic or hazardous organic contaminants from solid or liquid phase wastes which overcomes the above-described difficulties. Particularly, a process is desired which avoids the consumption or destruction of costly solvents or the use of incineration, high temperature oxidation, or costly chemical reagents in the contaminant destruction stages, and which does not significantly contribute to secondary waste disposal problems, and which also makes on site destruction of contaminants feasible.

SUMMARY OF THE INVENTION

The present invention provides a process for treating a liquid or solid phase waste containing an organic contaminant which can be photodegraded, wherein the waste is contacted with a perfluorinated solvent to extract the contaminant and thereafter the perfluorinated solvent containing the contaminant is irradiated with U.V. light.

The process of this invention overcomes many of the prior art disadvantages because the perfluorinated solvent is inert to the contaminant degradation step and can therefore be recovered and recycled. Furthermore, the hydrophobic nature of the perfluorinated solvent make it a desirable solvent extractant for many organic contaminants. The hydrophobic nature of the solvent also allows the process to be practised by first extracting an organic contaminant from solid or liquid waste into a hydrophilic solvent and then transferring the contaminant to the perfluorinated solvent prior to photodegradation. In this way, contaminants which exhibit better extraction efficiencies to a hydrophilic and often less expensive solvent, can be removed from the waste, but the hydrophilic solvent can be recovered and recycled without being degraded in the photodegradation step.

In one preferred embodiment of the process, a photo-oxidant such as ozone, hydrogen peroxide, hypochlorite, chlorine dioxide or chlorines, most preferably ozone, is added to the perfluorinated solvent containing the contaminant to enhance the photodegradation step. A photo-oxidant is an oxidant which increases its oxidation potential or which produces other oxidizing species under U.V. irradiation, thereby enhancing the photodegradation (in this case, the photo-oxidation) of the organic contaminant.

A large number of toxic or hazardous organic contaminants can be removed and degraded by this process, since most of them can be photodegraded. The term photodegradation, as used in this specification and in the claims is the degradation with U.V. light of an organic contaminant to its primary components, usually water and carbon dioxide and, if the contaminant contains chlorine, nitrogen or sulphur, hydrochloric acid, nitric acid and sulphuric acid. It will be understood that the term photodegradation also includes the oxidation of an organic contaminant occurring as a result of any oxygen and/or air which may be present in the solvent containing the contaminant. Classes of organic contaminants which have been demonstrated with this process include aromatics, chlorinated hydrocarbons, chlorinated aromatics, polychlorinated biphenyl compounds, polyaromatics, alkanes typical of gasoline or petroleum fuel fractions and nitroaromatics. The ability of a contaminant to be photodegraded can be determined by its U.V. spectrum.

DETAILED DESCRIPTION OF THE PREFERRED EMBODIMENT

Figure 1:
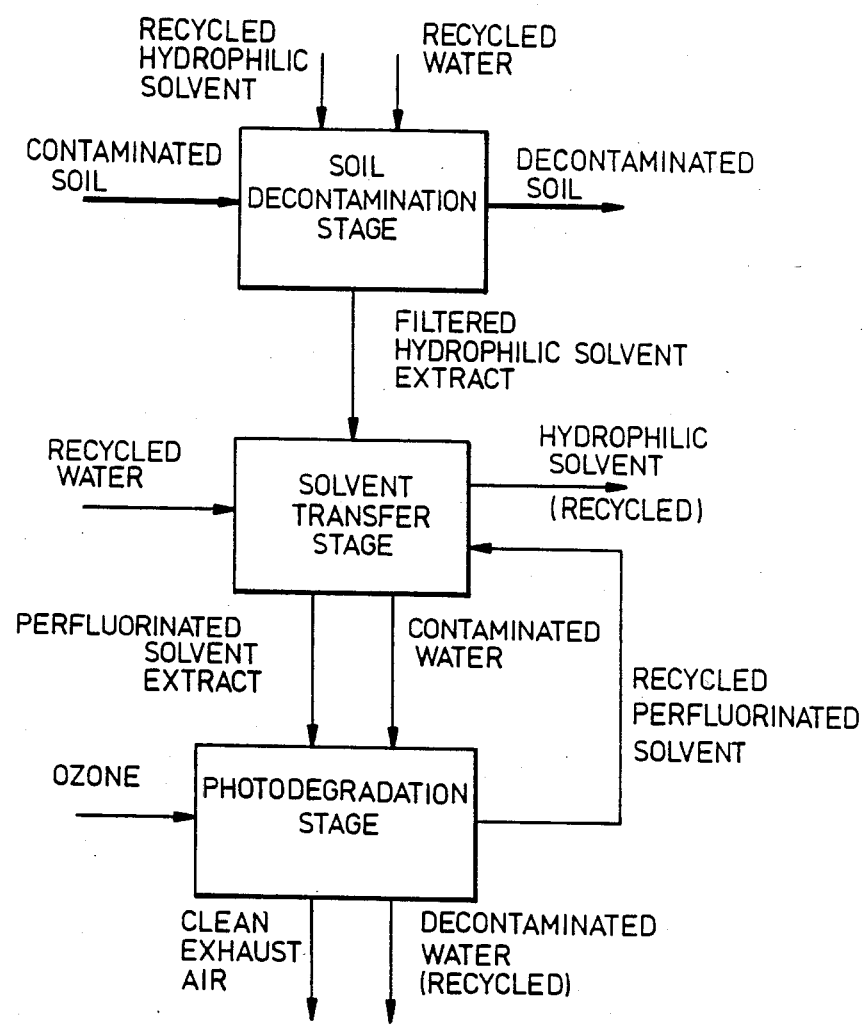
FIG. 1 is a schematic flow sheet of the process of the present invention when practised with a contaminated soil.

In general, solid or liquid phase wastes are treated by the process of this invention. Most often, the wastes include soils and waters contaminated from leakage or spills from underground storage tanks and industrial disposal sites. Typical photodegradable organic contaminants in such wastes include benzanthracene, chloronaphthalene, cresols, chrysene, 2,4 D, dichlorobenzenes, dinitrobenzenes, dioxane, epichlorohydrin, fluoranthene, methylethylketone, nitrophenols, nitropropopane, o-chlorophenol, PCBs (Aroclors), phenols, propylenedichloride, 2,4,5 T, tetrachloroethylene, toluene, trichlorethane, trichloroethylene, vinylidenechloride and xylenes.

The solid or liquid phase waste, in accordance with this process, is contacted with a perfluorinated solvent to extract the contaminant from the waste. The remainder of the waste is then removed so that other organic components of the waste do not interfere with the photodegradation step. Such interference can arise either because the other components themselves absorb U.V. light or because they cause undesired reactions with important free radicals, making the photodegradation less effective. The perfluorinated solvent containing the contaminant is then irradiated with U.V. light to photodegrade the contaminant. Depending on the contaminant, the products of the photodegradation step are as follows:

| Contaminant Class | Photodegradation Products |
|---|---|
| Hydrocarbon | $CO_2$, $H_2O$ |
| Chlorinated hydrocarbon | $CO_2$, $H_2O$, $Cl^-$ |
| Organic nitrogen compound | $CO_2$, $H_2O$, $NO_3^-$ |
| Organic sulphur compound | $CO_2$, $H_2O$, $SO_4^=$ |

Perfluorinated solvents, the inventors have found, are advantageously used in the photodegradation of organic contaminants for several reasons. Importantly, they are optically transparent in the U.V. region of interest; most organic contaminants absorb in the 180–400 nm range. Also, the solvents are not significantly attacked by any of the powerful oxidizing species, such as the hydroxyl or $O(^3P)$ radicals, generated during photolysis. Furthermore, the solvents are chemically inert and immiscible with water. The latter property allows for the phase separation of the perfluorinated solvent with the contaminant from a water and/or hydrophilic solvent phase, as will be described hereinafter. While the perfluorinated solvents are more expensive than other solvents, their use in the photodegradation step of this process does not interfere with the recovery and recycle of the solvent, making them cost-effective in this process.

The process has been demonstrated with the following preferred perfluorinated solvents-perfluorodecalin, perfluorooctane, perfluoromethylcyclohexane, perfluorobutyltetrahydrofuran, Aflunox 606 and FC-77. The last two of these solvents are proprietary mixtures of perfluorinated solvents, having the general analyses shown in Table 1

TABLE 1

| Properties of Solvents | | |
|---|---|---|
| | FC-77[1] | Aflunox[2] |
| Typical Boiling Point (°C.) | 97 | |
| Pour Point (°C.) | −110 | −60 |
| Density, 25° C. (g/cm³) | 1.78 | 1.88 |
| Kinematic Viscosity, 25° C. (cs) | 0.8 | .68 |
| Vapour Pressure, 25° C. (Torr) | 42 | $9 \times 10^{-6}$ |
| Specific Heat, 25° C., (gcal/g °C.) | 0.25 | |
| Heat Vaporization at B.P. (gcal/g) | 20 | |
| Thermal Conductivity, 25° (W/cm K.) | 0.00063* | |
| Solubility of Water ppm (wt) | 13 | Negligible |
| Solubility of Air mlgas/100 ml liq | 41 | |
| Average Molecular Weight | 415 | 2100 |
| Chemical Family | $C_6$–$C_8$ | perfluoro-alkylpolyethers |
| Chemical Name/Synonyms | Fluorinert Electronic Liquid | Oxirane, trifluoro-(trifluoromethyl)-, homopolymers |

TABLE 1-continued

| Properties of Solvents | | |
|---|---|---|
| | FC-77[1] | Aflunox[2] |
| Manufacturer | 1 | 2 |

*estimated value
[1]Tradename of 3M Commercial Chemicals Division, St. Paul, Minnesota
[2]Tradename of SCM Specialty Chemicals, Gainsville, Florida The photodegradation step utilizes U.V. light, typically from a lamp with an output between 180 and 400 nm, since most organic contaminants undergo photodegradation at less than 400 nm. High or low pressure mercury vapour lamps, metal halide lamps and xenon lamps are exemplary. Input powers of 450 W to 60 kW are generally used.

For most contaminants, the cost efficiency of the photodegradation step can be improved by adding a photo-oxidant. While ozone is the most preferred photo-oxidant, hydrogen peroxide, hypochlorite or chlorine dioxide are other exemplary photo-oxidants. Ozone is added to the perfluorinated solvent containing the contaminant by such equipment as in-line mixers or spargers. Concentrations of between 10 to 100 ppm of ozone in the perfluorinated solvent are usually adequate.

With some wastes, particularly with many solid phase wastes, the extraction efficiency for some contaminants is often better with a hydrophilic solvent and/or water than with a perfluorinated solvent. Thus, when the process is practised with solid wastes such as contaminated soils, sediments and sludges, the waste is first contacted with a hydrophilic solvent and/or water. Water soluble contaminants such as phenol, cresol and orthochlorophenol can be extracted with water alone. Other organic contaminants are usually extracted with a hydrophilic solvent such as acetone, methanol, isopropanol or other alcohols, acetonitrile or dimethylsulphoxide. Acetone and methanol are typically the most preferred solvents. Water can be added if it improves the extraction efficiency.

The remaining solid waste is removed and the hydrophilic solvent and/or water containing the contaminant is then contacted with the perfluorinated solvent to transfer the contaminant to the latter solvent. If water is not already present, it can be added to improve the transfer efficiency to the perfluorinated solvent. The water acts to reduce the solubility of the contaminant in the mixture and increase the mass transfer efficiency to the perfluorinated solvent.

At this stage, two phases are present, one phase comprising the hydrophilic solvent with any water that is present and another phase comprising the perfluorinated solvent containing the organic contaminant. The phases are separated and the perfluorinated solvent phase is subjected to the photodegradation step to destroy the contaminant.

Figure 2:
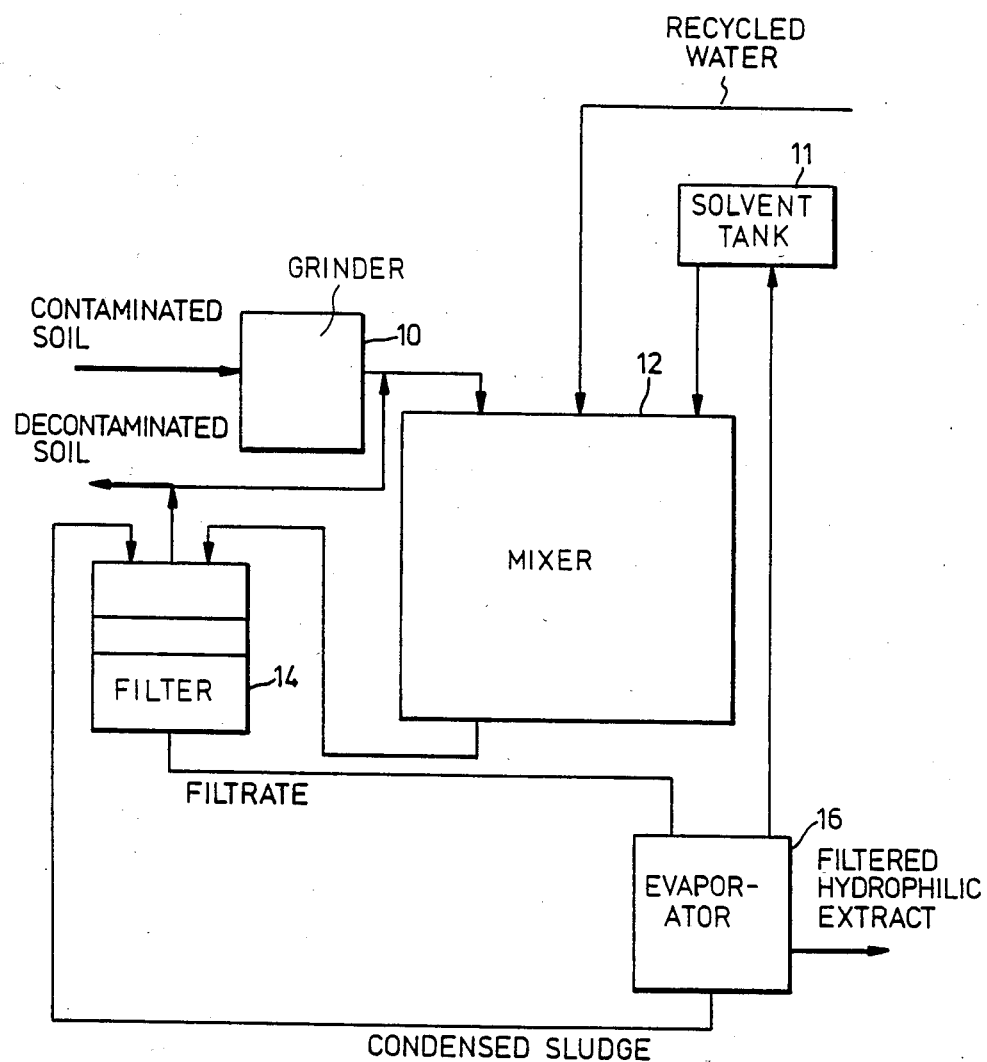
FIG. 2 is a flow sheet of one form of the process step wherein the soil is contacted with a hydrophilic solvent.

The operation of the process when practised with a contaminated soil will now be described with reference to the figures. As illustrated in FIG. 1, the process includes three major stages, a soil decontamination stage, a solvent transfer stage and a photodegradation stage. Each of these three stages is illustrated in greater detail in FIGS. 2, 3 and 4 respectively.

Figure 3:
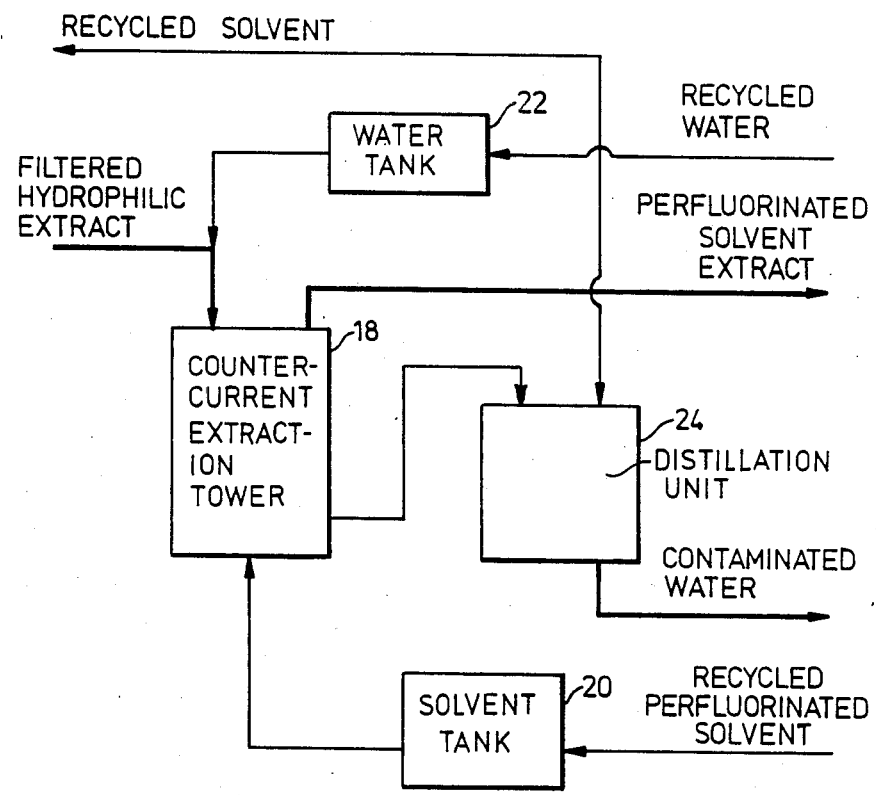
FIG. 3 is a flow sheet of one form of the process step wherein the contaminant is extracted to the perfluorinated solvent.

In the first, soil decontamination stage (FIG. 2), the soil is ground in a grinder 10 and then contacted with the hydrophilic solvent from solvent tank 11 and/or with water in a mixer 12. Sonification in the mixer is preferably performed to facilitate solubilization of the contaminant. The mixture is then transferred to a filter 14. The solids are dried and returned to the earth while the filtrate is concentrated in an evaporator 16 and refiltered before being transferred to the next stage. (FIG. 3)

The solvent transfer stage comprises a liquid-liquid extraction unit, including, for example, a pulsed, counter-current extraction tower 18 which receives the filtered hydrophilic solvent extract from the previous stage and the perfluorinated solvent from solvent tank 20. Water may also be added from water tank 22. The contaminant, once extracted to the perfluorinated solvent, is removed in that phase to the photodegradation stage (FIG. 4) The hydrophilic solvent with any added water is transferred to a distillation unit 24 for separation. The hydrophilic solvent is recycled to the soil decontamination stage while the water, with any traces of organic contaminants, is transferred to the photodegradation stage to destroy the residual contaminants before transferring the water back to the first two stages.

Figure 4:
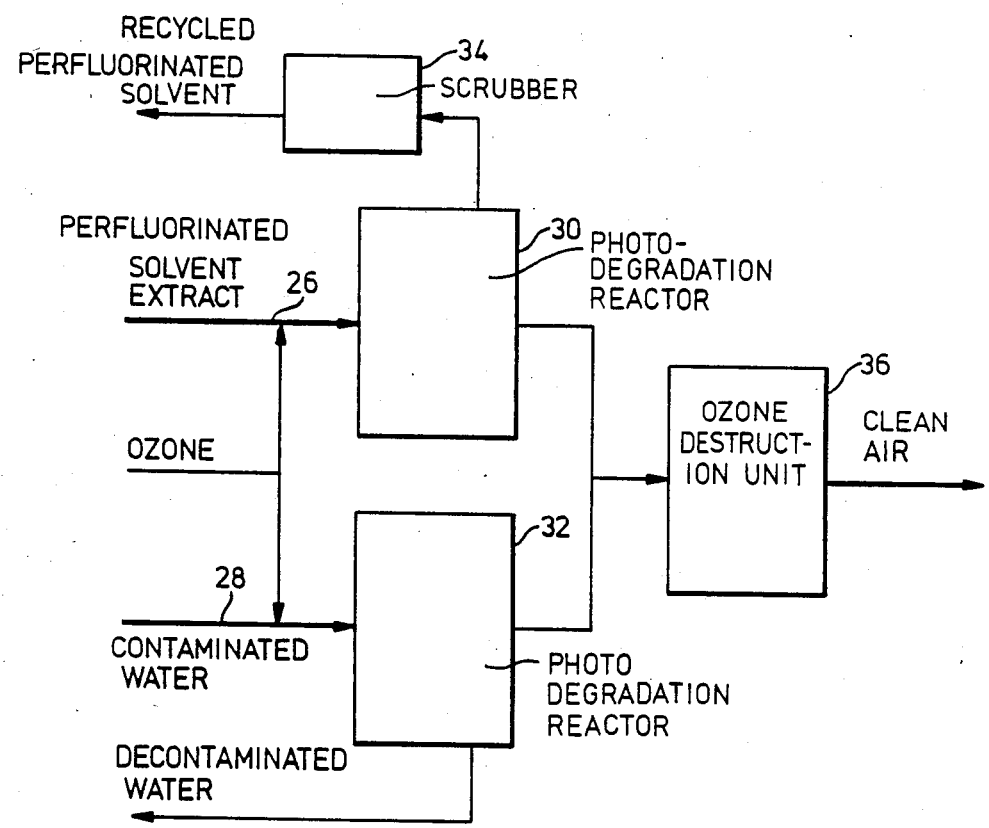
FIG. 4 is a flow sheet of one form of the photodegradation step using ozone as a photo-oxidant.

The photodegradation stage of FIG. 4 includes two lines 26 and 28 for the perfluorinated solvent and the contaminated water respectively. The lines lead to photodegradation reactors 30, 32, which comprise annular quartz photo reactor tubes equipped with high intensity U.V. lamps. Ozone is added as the photo-oxidant in each of the lines 26 and 28 through in-line mixers (not shown). The perfluorinated solvent is passed through a scrubber 34 to remove the acidic products (when present) of photodegradation before being recycled to stage two. The decontaminated water is recycled to the first two stages of the process. Any residual ozone is destroyed in an ozone destruction unit 36, which contains an ozone-decomposing catalyst such as a metal oxide catalyst or an ozone adsorbant such as activated carbon. The air exhausted from the process will contain the degradation product carbon dioxide. The water formed during the degradation can be recycled with the perfluorinated solvent as it will not interfere with the transfer step and will reach an equilibrium.

To demonstrate the operability of the process of the present invention, the following examples are included.

EXAMPLE 1

The process was demonstrated with a PCB-contaminated soil. The soil decontamination stage was conducted by contacting the 10 g soil with acetone in a 1:2–3 (by weight) ratio. Typically, in practice, 1 m³ of soil will be treated in a batch. This contacting step was repeated up to three times to give a 99.99% removal of the PCB from a soil containing up to 3,000 ppm PCB. All extracts were combined and treated together. The total extract volume will typically be 10–30 m³. The acetone-PCB mixture was concentrated by a factor of three. The evaporated acetone was recycled. Between two and three volumes of water (compared to remaining acetone) were added to the concentrated PCB solution. An equal volume of FC-77 perfluorinated solvent (as compared to acetone, will typically be 3–10 m³ of FC-77) was added to transfer the PCB from the acetone/water phase to FC-77. The PCB in FC-77 phase was separated and then irradiated with a high pressure mercury vapour lamp (output 180–400 nm, input 450 W for 1 hour). In practice 20 kW lamps for 16–20 hours will be used. Ozone was added through an in-line mixer prior to irradiation. Ozone concentrations of 20–50 ppm were used. The acetone/water phase was separated and water was treated in the same manner as the perfluorinated solvent to destroy residual PCB. After irradiation, 95% of the PCB had been destroyed. To obtain higher destruction efficiencies, longer irradiation times, higher lamp powers and higher ozone concentrations were used. A 95% PCB destruction was found to be sufficient for recycle of the FC-77 in the process.

EXAMPLE 2

This example is included to demonstrate the extraction efficiencies of two hydrophilic solvents, acetone and methanol, and a perfluorinated solvent, FC-77, on contaminated topsoils. The soils, containing 50% moisture and different contaminants were decontaminated by contacting with 90 ml of solvent per 10 g of soil containing about 100 ppm of each contaminant. The extraction efficiencies are shown in Table 2 below for seven contaminants.

TABLE 2

| Contaminant | Contaminant Class | % Extraction Efficiency | | |
|---|---|---|---|---|
| | | Acetone | FC-77 | Methanol |
| Napthalene | Aromatic | 56 | 31 | 38 |
| Fluorene | Aromatic | 100 | 51 | 69 |
| *Arochlor 1254 | PCBs | 100 | 23 | 61 |
| Dichlorobenzene | Chlorinated Aromatic | 84 | 74 | 100 |
| Tetrachloroethylene | Chlorinated hydrocarbon | 81 | 47 | 51 |
| Decane | Gasoline Type Alkane | 88 | 71 | 50 |
| Xylene | Aromatic | 92 | 61 | 82 |

*From Monsanto, mixture of chlorinated biphenyls with about 54% chlorine content. Average Cl/molecule = 4.96, Density 1.495, Distillation range 365–390° F.

For higher extraction efficiencies, higher solvent:soil ratios can be used.

The examples demonstrate that the extraction efficiency from soil with respect to most contaminants is better with a hydrophilic solvent, particularly with acetone, than it is with the perfluorinated solvent.

EXAMPLE 3

This example is included to illustrate the transfer efficiencies from hydrophilic solvents and/or water to a perfluorinated solvent. All extractions were performed with equal volumes of FC-77 and hydrophilic solvent, with an approximate contaminant concentration in the solvent of 100 ppm. Where applicable three parts of water were added (based on hydrophilic solvent) to the extraction mixture. The results are shown below in Table 3 as percent contaminant transfer to the FC-77.

TABLE 3

| Contaminent | From Methanol | From Acetone | From Methanol/ $H_2O$ 1:3 | From Acetone/ $H_2O$ 1:3 | From $H_2O$ |
|---|---|---|---|---|---|
| Napthalene | 3 | 1 | 74 | 62 | / |
| Fluorene | 2 | 3 | 77 | 64 | / |
| Arochlor 1254 | 0 | 0 | 85 | 88 | 100 |
| Dichlorobenzene | 6 | 3 | 61 | 49 | / |
| Tetrachloroethylene | / | / | / | 88 | / |
| Decane | / | / | / | 98 | / |
| Xylene | / | / | / | 94 | / |

/ not measured

The results illustrate that, for most organic contaminants, the transfer efficiency to the perfluorinated solvent from a hydrophilic solvent is greatly improved with the addition or presence of water. For a contaminant such as PCB in water alone, excellent transfer efficiency is achieved directly to the perfluorinated solvent, without an initial hydrophilic solvent extraction.

To increase the transfer efficiency from the hydrophilic solvent/water mixture to the perfluorinated solvent, the volume of the latter can be increased or the volume of the water added can be increased.

EXAMPLE 4

To illustrate the operability of a wide range of perfluorinated solvents, samples of water containing 20 ppm of 2,4-dinitrotoluene were contacted (1 part water, 1 part solvent) with a perfluorinated solvent. The mixture was shaken for 30 seconds and the extraction efficiency measured. The results are tabulated below in Table 4.

TABLE 4

| Relative Extraction Efficiencies of Perfluorinated Solvents | |
|---|---|
| Solvent | % 2,4 DNT Extracted |
| Perfluorodecalin | 58 |
| Perfluorooctane | 52 |
| Perfluoromethylcyclohexane | 53 |
| Perfluorobutyltetrahydrofuran | 56 |
| Aflunox 606 (Produced emulsion in water) | 30 |
| FC-77 | 52 |

EXAMPLE 5

This example is included to demonstrate the destruction efficiency of the photodegradation step of the process with various contaminants. The contaminant in FC-77 was irradiated for 15 minutes with a high pressure mercury vapour lamp (output 180–400 nm). The same contaminant mixture as also irradiated under the same conditions but with an ozone concentration of 20–40 ppm to demonstrate the increased efficiency for most contaminants with a photo-oxidant. The percent removal of the contaminant is tabulated below in Table 5.

TABLE 5

| Photodecomposition in FC-77 | | | |
|---|---|---|---|
| | | % Removed | |
| Compound | Initial Conc(ppm) | After Irradiation | After Irradiation/ Ozone |
| Napthalene | 100 | 8 | 100 |
| Fluorene | 100 | 16 | 100 |
| Arochlor 1254 | 85 | 22 | 45 |
| Dichlorobenzene | 100 | 61 | 54 |
| Tetrachloroethylene | 100 | 95 | 96 |
| Decane | 100 | 4 | 47 |
| Xylene | 100 | 10 | 93 |
| 2,4-Dinitrotoluene | 63 | 56 | 100 |

To obtain higher destruction efficiencies, longer irradiation times, higher lamp outputs or higher ozone concentrations can be used.

While the above preferred embodiments of the process have been described, it will be understood that changes and variations can be made without departing from the spirit and scope of the invention, as defined in the following claims.

We claim:

1. A process of treating a solid or liquid phase waste containing an organic contaminant which can be photodegraded, comprising:

contacting the solid or liquid phase waste with a perfluorinated solvent to extract the contaminant into the perfluorinated solvent; and irradiating the perfluorinated hydrocarbon solvent containing the contaminant with U.V. light at any wavelength between about 180 and 400 nm to photodegrade the contaminant.

2. The process as claimed in claim 1, which further comprises:

first contacting the waste containing the contaminant with a hydrophilic solvent to extract the contaminant into the hydrophilic solvent;

separating the hydrophilic solvent from the solids in the event the waste being treated is solid;

contacting the hydrophilic solvent containing the contaminant with the perfluorinated solvent to extract the contaminant into the perfluorinated solvent; and removing the hydrophilic solvent from the perfluorinated solvent containing the contaminant prior to the photodegradation step.

3. The process as claimed in claim 1, wherein the waste is solid and wherein the process further comprises:

first contacting the solid waste with one or both of a hydrophilic solvent or water to extract the contaminant;

separating the solids from the hydrophilic solvent or water containing the contaminant;

contacting the hydrophilic solvent or water containing the contaminant with the perfluorinated solvent to extract the contaminant into the perfluorinated solvent; and removing the hydrophilic solvent from the perfluorinated solvent containing the contaminant prior to the photodegradation step.

4. The process as claimed in claim 1, wherein the waste is aqueous.

5. The process as claimed in claim 3, wherein the solid waste is first contacted in the first step with a hydrophilic solvent.

6. The process as claimed in claim 5, wherein water is added when the contaminant is extracted to the perfluorinated solvent to improve the transfer efficiency of the contaminant into the perfluorinated solvent, and wherein the hydrophilic solvent and the water are removed from the perfluorinated solvent containing the contaminant prior to the photodegradation step.

7. The process as claimed in claim 1, 2 or 3, wherein a photo-oxidant is added to the perfluorinated solvent containing the contaminant.

8. The process as claimed in claim 4, wherein a photo-oxidant is added to the perfluorinated solvent containing the contaminant.

9. The process as claimed in claim 6, wherein a photo-oxidant is added to the perfluorinated solvent containing the contaminant.

10. The process as claimed in claim 8, wherein the photo-oxidant is ozone.

11. The process as claimed in claim 9, wherein the photo-oxidant is ozone.

12. The process as claimed in claim 2, 3 or 5, wherein the hydrophilic solvent is acetone or methanol.

13. The process as claimed in claim 11, wherein the hydrophilic solvent is acetone or methanol.

14. The process as claimed in claim 1, 2 or 3, wherein the solid waste is soil, sediment or sludge.

15. The process as claimed in claim 13, wherein the solid waste is soil, sediment or sludge.

16. The process as claimed in claim 1, 2 or 3, wherein the contaminant is one or more of an aromatic, an alkane, a chlorinated hydrocarbon, a chlorinated aromatic, a polychlorinated biphenyl, a polyaromatic and a nitro-aromatic compound.

17. The process as claimed in claim 1, 2 or 3 wherein, the perfluorinated solvent is one or more of perfluorodecalin, perfluorooctane, perfluoromethylcyclohexane, perfluorobutyltetrahydrofuran, FC-77 and Aflunox.

18. The process as claimed in claim 10, wherein, the perfluorinated solvent is one or more of perfluorodecalin, perfluorooctane, perfluoromethylcyclohexane, perfluorobutyltetrahydrofuran, FC-77 and Aflunox.

19. The process as claimed in claim 13, wherein, the perfluorinated solvent is one or more of perfluorodecalin, perfluorooctane, perfluoromethylcyclohexane, perfluorobutyltetrahydrofuran, FC-77 and Aflunox.

20. The process as claimed in claim 18 or 19, wherein the contaminant is one or more of napthalene, fluorene, polychlorinated biphenyl, dichlorobenzene, tetrachloroethylene, decane, xylene and 2,4-dinitrotoluene.

* * * * *